United States Patent
Smith et al.

(10) Patent No.: US 10,371,566 B1
(45) Date of Patent: Aug. 6, 2019

(54) LOAD CELL FAILURE DETECTION AND DELAYED REPAIR

(71) Applicant: Air Liquide Electronics U.S. LP, Dallas, TX (US)

(72) Inventors: Bryan L. Smith, Lakeville, MN (US); Mark Stang, Eden Prairie, MN (US); Mike Miano, Chaska, MN (US); Billy W. Luetkahans, Carver, MN (US); Daniel J. Fuchs, Chanhassen, MN (US); Matt Kelly, Maple Plain, MN (US); Bryon Perkins, New Prague, MN (US); Justin Gauthier, Waconia, MN (US); Kevin T. O'Dougherty, Arden Hills, MN (US)

(73) Assignee: Air Liquide Electronics U.S. LP, Dallas, TX (US)

( * ) Notice: Subject to any disclaimer, the term of this patent is extended or adjusted under 35 U.S.C. 154(b) by 45 days.

(21) Appl. No.: 15/394,966

(22) Filed: Dec. 30, 2016

(51) Int. Cl.
*G01G 17/04* (2006.01)
*G01G 23/01* (2006.01)

(52) U.S. Cl.
CPC ............ *G01G 23/01* (2013.01); *G01G 17/04* (2013.01)

(58) Field of Classification Search
CPC ............................. G01G 17/04; G01G 23/01
See application file for complete search history.

(56) References Cited

U.S. PATENT DOCUMENTS

| | | | | |
|---|---|---|---|---|
| 4,219,091 A | * | 8/1980 | Kleinhans | G01G 3/1402 177/132 |
| 4,407,160 A | * | 10/1983 | van de Velde | G01G 3/1404 177/211 |
| 4,550,792 A | | 11/1985 | Mosher et al. | |
| 4,582,454 A | * | 4/1986 | Brandenburg | C21B 5/003 110/104 R |
| 5,640,334 A | * | 6/1997 | Freeman | G01G 23/015 177/1 |
| 6,112,162 A | * | 8/2000 | Richards | G01G 23/12 702/101 |
| 6,787,713 B2 | * | 9/2004 | Kuechenmeister | G01G 17/04 177/132 |
| 9,587,974 B2 | * | 3/2017 | Wechselberger | G01G 23/3735 |
| 9,719,845 B2 | * | 8/2017 | Kjar | G01G 23/005 |
| 9,815,036 B2 | * | 11/2017 | Maguire | B01F 13/1066 |
| 2003/0019797 A1 | * | 1/2003 | Yamamoto | B07C 5/18 209/592 |
| 2003/0042050 A1 | * | 3/2003 | Stimpson | G01G 3/141 177/132 |
| 2003/0158684 A1 | * | 8/2003 | Livingston | G01G 23/01 702/101 |
| 2004/0026135 A1 | * | 2/2004 | Huitt | G01G 3/1408 177/210 R |
| 2008/0271927 A1 | * | 11/2008 | Crain | G01G 13/16 177/1 |

(Continued)

FOREIGN PATENT DOCUMENTS

CN 103 604 479 A 2/2014

*Primary Examiner* — Natalie Huls
(74) *Attorney, Agent, or Firm* — Patricia E. McQueeney; Allen E. White

(57) ABSTRACT

Liquid tank measuring systems that weigh/measure the amount of liquid in a fixed tank/vessel are disclosed. Also disclosed are methods that provide load cell failure detection of the liquid tank measuring system and the ability to continue operations post load cell failure detection.

9 Claims, 6 Drawing Sheets

(56) References Cited

U.S. PATENT DOCUMENTS

| | | | |
|---|---|---|---|
| 2012/0061150 A1* | 3/2012 | Coulombe | G01G 21/184 177/54 |
| 2012/0200697 A1* | 8/2012 | Wuestefeld | G01F 1/00 348/137 |
| 2014/0144714 A1* | 5/2014 | Kjar | G01G 17/00 177/1 |
| 2015/0014068 A1* | 1/2015 | Volker | B01D 61/04 177/45 |
| 2015/0060155 A1* | 3/2015 | Michaluk, III | G01G 17/04 177/25.12 |
| 2016/0018254 A1* | 1/2016 | Wechselberger | G01G 23/3735 177/1 |
| 2016/0264394 A1* | 9/2016 | Hershberger | B67D 1/0801 |
| 2017/0089754 A1* | 3/2017 | Otaki | G01F 25/0046 |
| 2017/0122794 A1* | 5/2017 | Schmidt | G01G 19/414 |

* cited by examiner

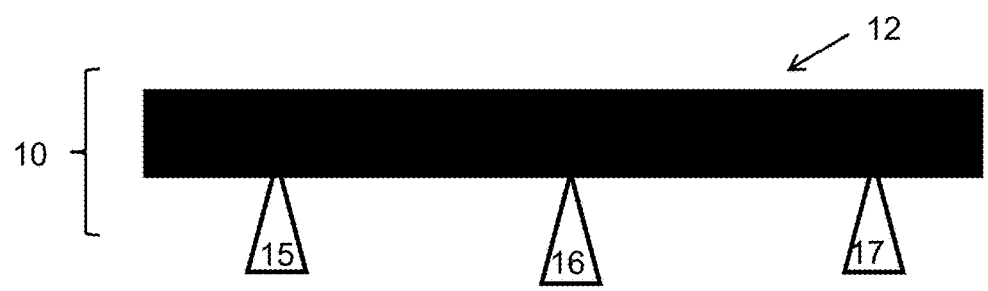
FIG 6 – Prior Art
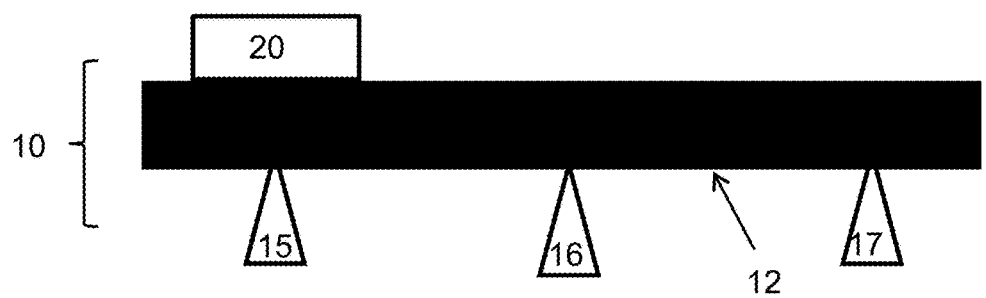
FIG 7 – Prior Art

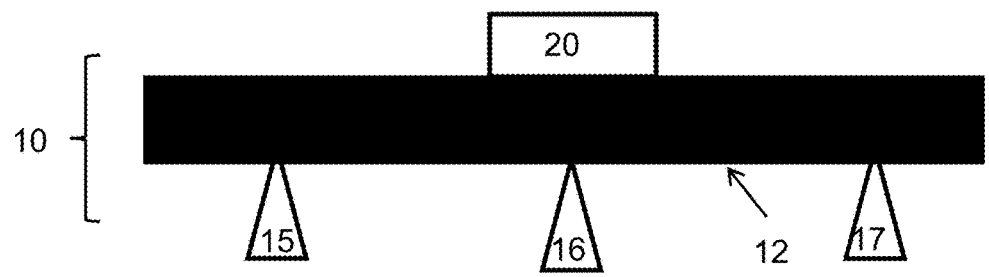
FIG 8 – Prior Art
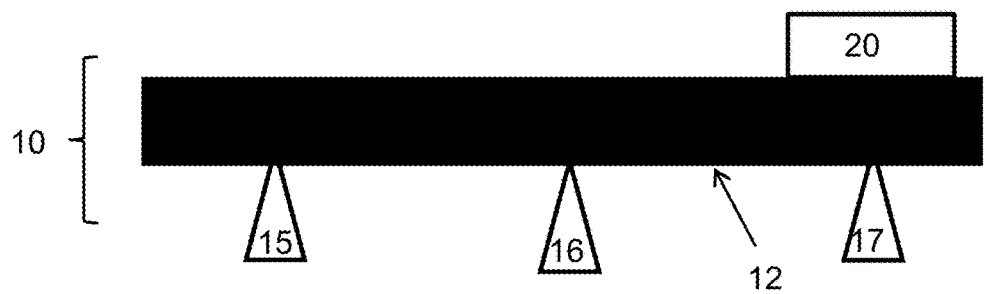
FIG 9 – Prior Art

US 10,371,566 B1

LOAD CELL FAILURE DETECTION AND DELAYED REPAIR

TECHNICAL FIELD

Liquid tank measuring systems that weigh/measure the amount of liquid in a fixed tank/vessel are disclosed. Also disclosed are methods that provide load cell failure detection of the liquid tank measuring system and the ability to continue operations post load cell failure detection.

BACKGROUND

Platform scale systems tend to use multiple load cells due to the physical limitation of supporting and balancing large platforms from the bottom. Exceptions to this are when the load is suspended from above as in the case of a single point analytical balance or in some systems where the scale is mounted to the ceiling, a beam or a crane or mezzanine level from a single point.

For existing platform systems that utilize multiple individual load cells below the platform, the loads cells are balanced to calculate the total scale load. See, e.g., U.S. Pat. No. 4,550,792 to Eagle Machinery Company and U.S. Pat. No. 8,387,437 to Nintendo Co. Ltd. The designs focus on ensuring that the sum of the multiple load cells is calibrated and correct, regardless of where the weight is placed on the platform. However, failure of one cell may render the platform inaccurate or unuseable.

CN Pub Pat App No 103604469 to Zhengzhou Res Inst Mech Eng discloses a mass and mass center measuring system with a redundancy function. Abstract. The measurement control part is composed of a plurality of independent measurement units, all of which share data and are used as standby units to form redundancy and crossed redundancy. Id.

A need remains for improved platform scale systems, which remain functional and accurate even in the event of the failure of one of the load cells.

SUMMARY

Methods to detect load cell failure in a liquid tank measuring system are disclosed. The liquid tank measuring system comprises three or more load cells, a load cell transmitter communicating a signal from each of the three or more load cells to a programmable logic controller, a weighing platform connected to each of the three or more load cells, and a tank located on the weighing platform. The load cells are calibrated to measure a total weight on the platform. A processing liquid is added to the tank. The load cells are monitored to determine whether the weight determined by one load cell deviates from the weight determined by the remaining load cells. The disclosed methods may include one or more of the following aspects:
 the calibration step comprising determining a weight at each load cell of an empty tank and at least two known volumes of calibration liquid in the tank;
 the calibration liquid being the same as the processing liquid;
 cleaning the tank prior to the calibration step;
 scheduling repair of a load cell when the weight determined by that load cell deviates from the weight determined by the remaining load cells;
 monitoring the remaining amount of the three or more load cells for weight consistency until the load cell is repaired;
 performing the calibration step after a system failure or physical event disrupts the liquid tank measuring system;
 comprising 3 load cells;
 comprising 4 load cells; or
 comprising 10 load cells.

A liquid tank measuring system is also disclosed. The liquid tank measuring system comprises three or more load cells, a load cell transmitter communicating a signal from each of the three or more load cells to a programmable logic controller, a weighing platform connected to each of the three or more load cells, a tank located on the weighing platform, and the programmable logic controller which receives communication from the load cell transmitter. The disclosed liquid tank measuring system may include one or more of the following aspects:
 three or more load cell transmitters, each of the three or more load cell transmitters communicating with one of the three or more load cells;
 a load cell support block on which the three or more load cells are located;
 a load cell support block on which the three or more load cells are fastened; or
 three or more load cell mount levelers, each of the three or more load cell mount levelers connecting the weighing platform to one of the three or more load cells.

NOTATION AND NOMENCLATURE

Certain abbreviations, symbols, and terms are used throughout the following description and claims, and include:

As used herein, the indefinite article "a" or "an" means one or more.

As used herein, the terms "approximately" or "about" mean±2% of the value stated.

As used herein, the abbreviation "PLC" refers to a programmable logic controller and the abbreviation "UPW" refers to ultrapure water.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 6 is a simplified schematic diagram of a prior art platform measuring system;

FIG. 7 is a simplified schematic diagram of the prior art platform measuring system of FIG. 6 showing the effect on the calculated measurement when a weight is placed on the left side of the platform;

FIG. 8 is a simplified schematic diagram of the prior art platform measuring system of FIG. 6 showing the effect on the calculated measurement when a weight is placed on the center of the platform; and FIG. 9 is a simplified schematic diagram of the prior art platform measuring system of FIG. 6 showing the effect on the calculated measurement when a weight is placed on the right side of the platform.

DESCRIPTION OF PREFERRED EMBODIMENTS

Figure 1:
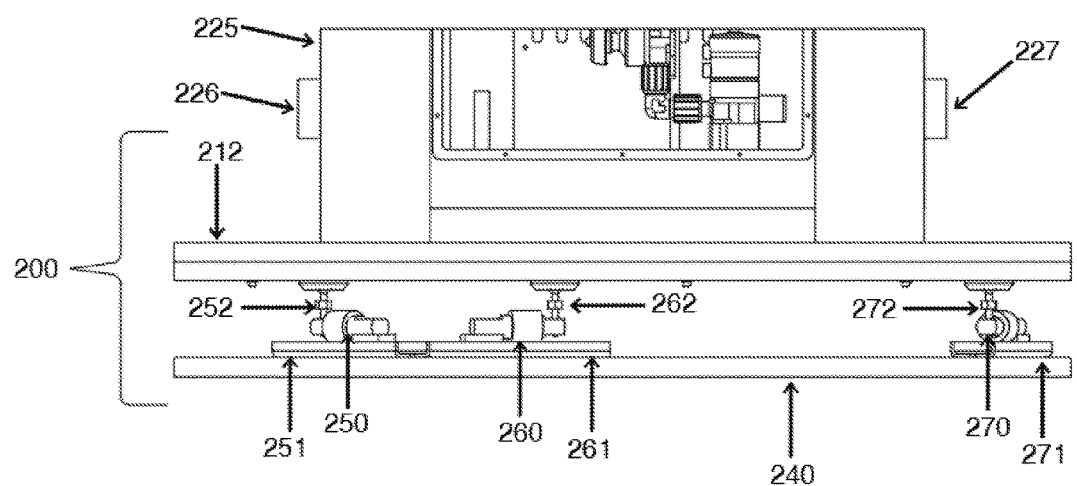
FIG. 1 is a schematic diagram of one embodiment of the disclosed liquid tank measuring system.

Liquid tank measuring systems are disclosed. The liquid tank measuring system may be used in semiconductor, photovoltaic, or flat panel display fabrication plants. As a result, accuracy is mandatory. Additionally, as any system down time may result in large economic consequences, reliability is also mandatory.

The disclosed liquid tank measuring systems include two or more load cells, and preferably three or more load cells. Each load cell is connected, directly or indirectly, to a weighing platform. Each load cell weighs the total mass on the weighing platform. The liquid tank measuring system may use two load cells in order to verify the accuracy of each load cell. However, when a discrepancy arises between the weight determined by each of the two load cells, the liquid tank measuring system must be shut down to determine which load cell is accurate, which may have economic consequences. When the liquid tank measuring system uses three or more load cells and a discrepancy arises in the weight from one of the load cells, use of the liquid tank measuring system may continue provided the results from the remaining load cells remain consistent. For monetary reasons or space constraints, the liquid tank measuring system may include only three load cells. Alternatively, to ensure sufficient redundancy, the liquid tank measuring system may include ten load cells. In another alternative between the two extremes, the liquid tank measuring system may include four or five load cells. The load cells may be selected based upon a combination of the budget/cost versus the desired accuracy of the measurements. Exemplary load cells include the aluminum strain gauge load cells sold by Scaime of Annemasse, France. One of ordinary skill in the art will recognize that other types and brands of load cells may also be used without departing from the teachings herein.

A load cell transmitter transmits a signal from each load cell to a programmable logic controller (PLC). The load cell transmitter energizes the load cell, receives the signal from the load cell, and passes the signal to the programmable logic controller. Preferably, for ease of use and repair, each load cell has its own load cell transmitter. Alternatively, one load cell transmitter may be used with multiple load cells. Exemplary load cell transmitters include the DIN rail housing weighing indicator sold by Scaime of Annemasse, France. One of ordinary skill in the art will recognize that other types and brands of load cell transmitters may also be used without departing from the teachings herein.

The load cell transmitter communicates the signal from the load cell to a programmable logic controller (PLC). The PLC stores the calibration information and continuously monitors each load cell signal for any weight differences between load cells greater than a fault threshold for a period of time. Exemplary PLCs include the Allen Bradley CompactLogix CPU model 1769-L33ER and 4-20 mA analog input module model 1769-IF8. One of ordinary skill in the art will recognize that other types and brands of PLCs may also be used without departing from the teachings herein.

The load cells may be located on a concrete floor or a load cell support block. Each load cell may be connected to its own load cell support block, as shown in FIG. 1. Alternatively, all of the load cells may be connected to one load cell support block. The load cell support blocks may help level the load cells and/or liquid tank measuring system on the floor. The load cell support block may also be used in order to delineate the system from the surrounding area and/or provide easier transportation of the liquid tank measuring system. Typically, the load cells are fastened to the load cell support block for safety reasons. The load cell support block may be a steel frame or polyethylene plate that is structurally capable of supporting the liquid tank measuring system.

The load cells may be connected directly to the weighing platform, for example, when using vertical compression load cells. Alternatively, each load cell may be connected to a load cell mount leveler, which is then connected to the weighing platform. The load cell mount leveler is a vertical riser connected to and supporting the weighing platform. The load cell mount levelers transmit the force from the platform to the load cells. The load cell mount leveler is made of a material suitable for use in the manufacturing environment in which the liquid tank measuring system is deployed and is typically corrosion resistant steel, such as stainless steel, or plastic, such as polyethylene. One of ordinary skill in the art will recognize whether a load cell mount leveler is needed based upon the load cell utilized.

The item to be weighed is placed on the weighing platform. Each of the load cells is calibrated to measure the full weight of the item placed on the platform. As a result and in contrast to the prior art weighing platforms that determine weight based on the sum total of weights at each load cell as shown in the examples that follow, the sensitivity of the load cell is not relevant and may be ignored.

To weigh liquid products, such as semiconductor slurries or solutions, a tank is required. The tank is large enough to hold between approximately 200 L to approximately 20,000 L of liquid or suspension, but preferably between approximately 500 L to approximately 1,000 L. The tank is preferably centered on the weighing platform, but accurate measurements are still obtained by the disclosed liquid tank measuring system when the location of the tank deviates from center. The tank is made of any material suitable for contact with the solution or slurry located therein without impacting quality. For example, the tank may be any steel alloy or stainless steel, including type 316. The alloy may be coated with a polymer, such as polytetrafluoroethylene or polyethylene.

Depending on the intended use of the liquid product, the tank may be supported on the weighing platform in a tank stand. The tank stand may support a mixer for use in the tank. The tank stand may include plumping, pumps, and valves that connect the tank to a drain or solvent source. The tank stand may incorporate a heat exchanger to maintain the tank at a desired temperature. The tank stand may further include level sensors. None of these components have an effect on the weighing process. However, changes to any of these components, such as removing the mixer or changing a valve, will result in the need to recalibrate the liquid tank measuring system.

FIG. 1 is a detailed schematic diagram of one embodiment of the disclosed liquid tank measuring system 200. The exemplary system 200 includes three load cells: 250, 260, and 270. Load cell 250 is connected to load cell support block 251 and load cell mount leveler 252. Load cell 260 is connected to load cell support block 261 and load cell mount leveler 262. Load cell 270 is connected to load cell support block 271 and load cell mount leveler 272. The load cell mount levelers 252, 262, and 272 are located on floor 240. Load cell mount levelers 252, 262, and 272 are connected to platform 212. A tank stand 225 is located on the platform 212. Tank stand 225 includes a solvent inlet 226 and outlet 227 to drain. The tank (not shown) may include multiple plumbing interfaces, either in the tank stand 225 or above the tank, that supply and remove fluids, including a $N_2$ blanket system to maintain the purity of the solution or slurry in the tank. As may be seen in FIG. 1, the disclosed liquid tank measuring system is particularly well suited for accurate delivery of large volumes of liquids for semiconductor, photovoltaic, or flat panel display applications.

Methods to detect load cell failure in the above liquid tank measuring systems are also disclosed. As discussed above, each of the load cells measures the total weight of the object on the weighing platform. In other words, the weight measured at each load cell is not added together to determine the total weight of the object being weighed.

In order to detect load cell failure, the liquid tank measuring system must be calibrated. When calibration is required, it may be desirable to clean the tank and any of its associated accessories, such as pumps, conduits, etc., prior to beginning the calibration process. Applicants believe that the disclosed liquid tank measuring system may be used for long time periods between calibrations barring any system failure or physical disruption to the system.

Figure 2:
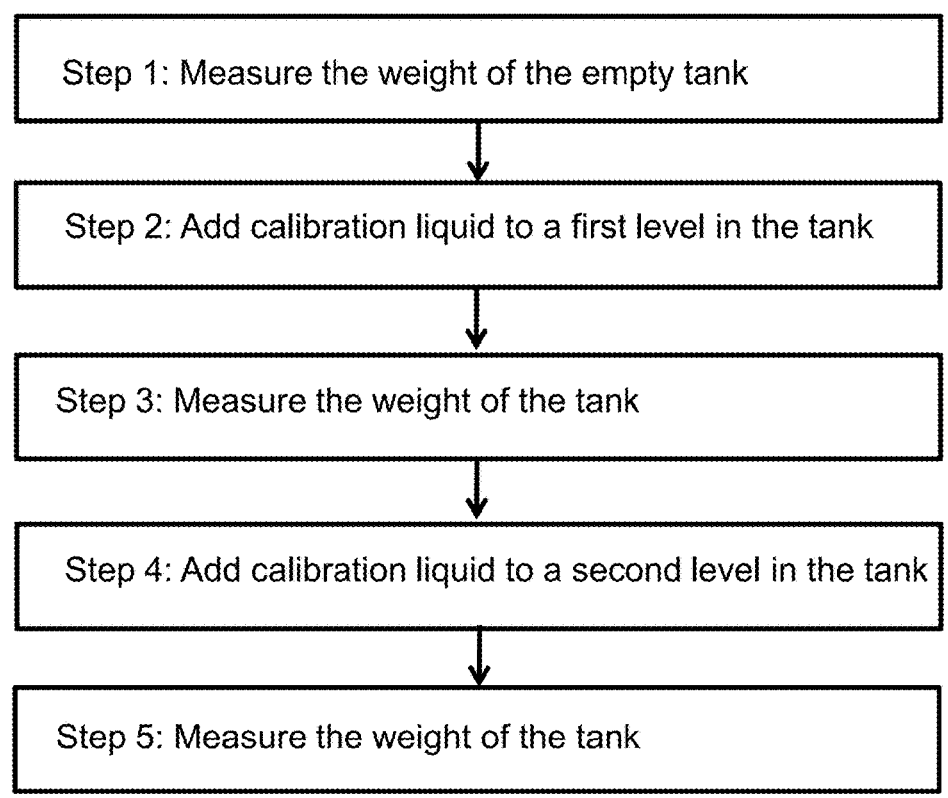
FIG. 2 is a flow chart of the calibration procedure for the disclosed liquid tank measuring system.

The calibration may be a simple 2-point calibration or may be more complicated having numerous calibration points for increased accuracy. Applicants have found that a 3-point calibration provides a good balance between accuracy versus effort. FIG. 2 is a flow chart for the 3-point calibration procedure. The calibration process uses the software provided by the manufacturer of the load cell. Each of the load cells may be calibrated individually. However, as the load cells are all connected to the weighing platform and measuring simultaneously, the load cells may also be calibrated simultaneously.

In step 1 of FIG. 2, the PLC records the signal at each load cell for the weight of the empty tank. In step 2, a calibration liquid, for example ultrapure water or UPW, is added to a specified volume and known weight. The tank may be marked to specify the desired volume. In step 3, the PLC records the signal at each load cell for the weight of the known volume of calibration liquid. In step 4, additional calibration liquid is added to a specified volume and known weight. Once again, the tank may be marked to specify the desired volume. In step 5, the PLC records the signal at each load cell for the weight of the known volume of calibration liquid.

Figure 3:
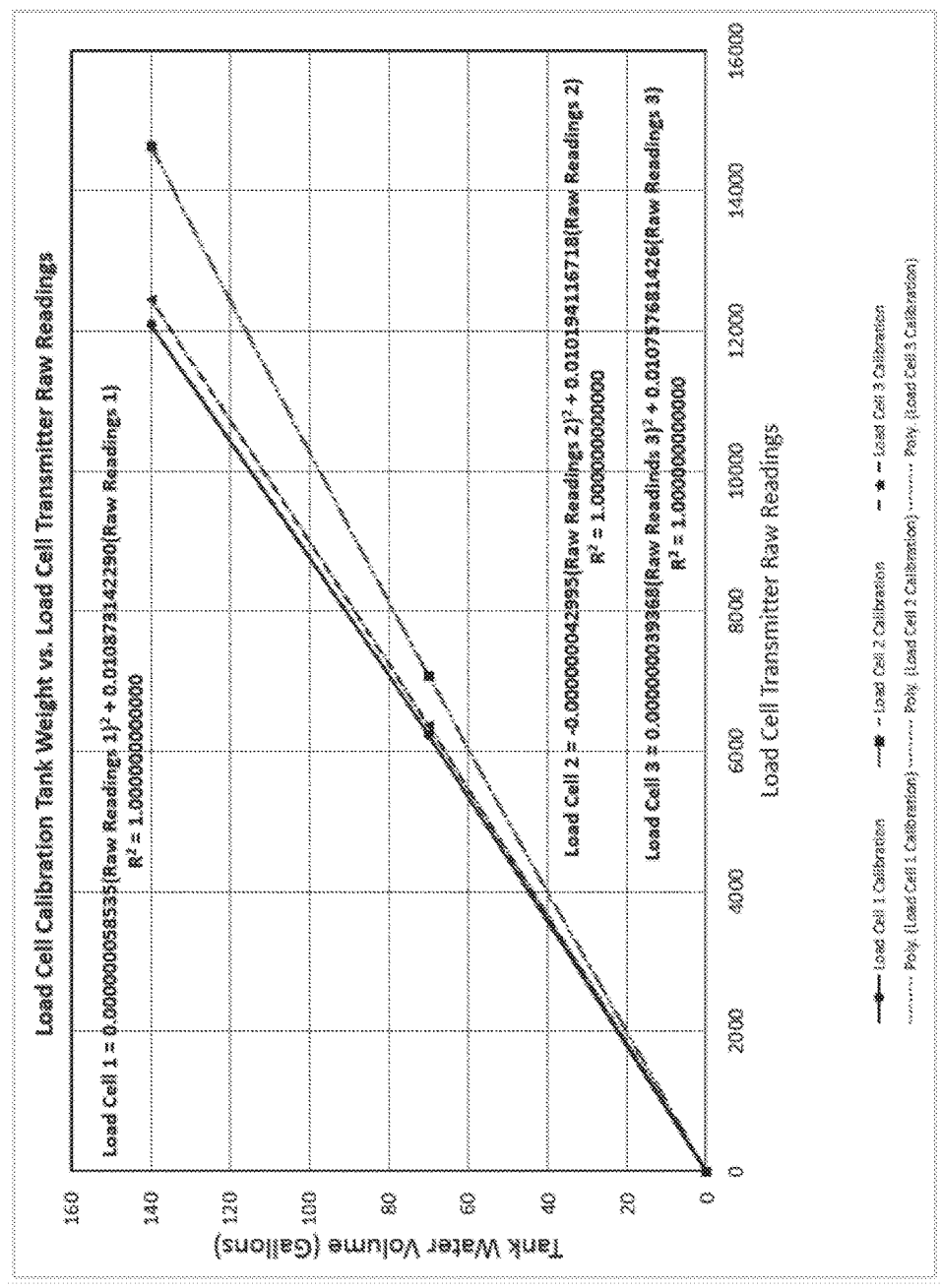
FIG. 3 is a graph of an exemplary calibration curve for 3 load sensors.

The results of an exemplary calibration curve following the procedure of FIG. 2 are provided in FIG. 3. As can be seen, the signals transmitted by the load cell transmitter to the PLC differ at step 3 and step 5. This is at least partly due to the location of the load cell in relation to the weighing platform and tank and partly due to the accuracy/sensitivity of the load cell. The PLC utilizes this information to set the load cell fault difference and calibration is complete. Recalibration is required after any system/component failure and/or physical disruption of the liquid tank measuring system such as, for example, any changes to the conduits connected to the tank or when the liquid tank measuring system is accidentally hit or jarred, for example, by stepping on the weighing platform or hitting the tank with a forklift. These types of aberrations would be detected by the PLC.

After calibration is complete, the liquid tank measuring system may be used for the intended process. The calibration fluid may be drained and the desired processing liquid added to the tank. Alternatively, if the desired processing liquid is the same as the calibration liquid, the liquid tank measuring system may be placed into service. In another alternative, additional components may be added to the calibration liquid to form the processing liquid in the tank.

The PLC monitors the load cells during processing to determine whether a weight determined by one of the load cells deviates from a weight determined by the remaining load cells. The PLC records any deviations and may set alarms to warn of such deviations. As discussed above, the disclosed liquid tank measuring system may be used for many months between calibrations, during which time any weight deviations are detected and recorded by the PLC.

When the results from one load cell deviate from the results of the remaining load cells, the PLC may calculate the weight based on the calibrated results of the remaining load cells and processing may continue. In other words, the deviant measurement is not included in the weight analysis. The cause of the deviation may be investigated while processing continues. For example, if someone accidentally steps on the weighing platform or jars the tank, causing a deviant reading from only one of the load cells, the load cell may be monitored to see whether it returns to its baseline measurements. If necessary, repair of the deviant load cell may be scheduled at a time that is convenient for the manufacturing facility. As a result, the disclosed system prevents interruption of the process.

The disclosed liquid tank measuring system may be installed anywhere and provide semiconductor quality measuring accuracy, without requiring a level weighing platform or centered tank load on the platform. The system monitors load cell drift, load cell circuit failures, load cell transmitter failures, and system disturbances. Additionally, any of these failures may not require a system shutdown.

EXAMPLES

The following non-limiting examples are provided to further illustrate embodiments of the invention. However, the examples are not intended to be all inclusive and are not intended to limit the scope of the inventions described herein.

Example

Figure 4:
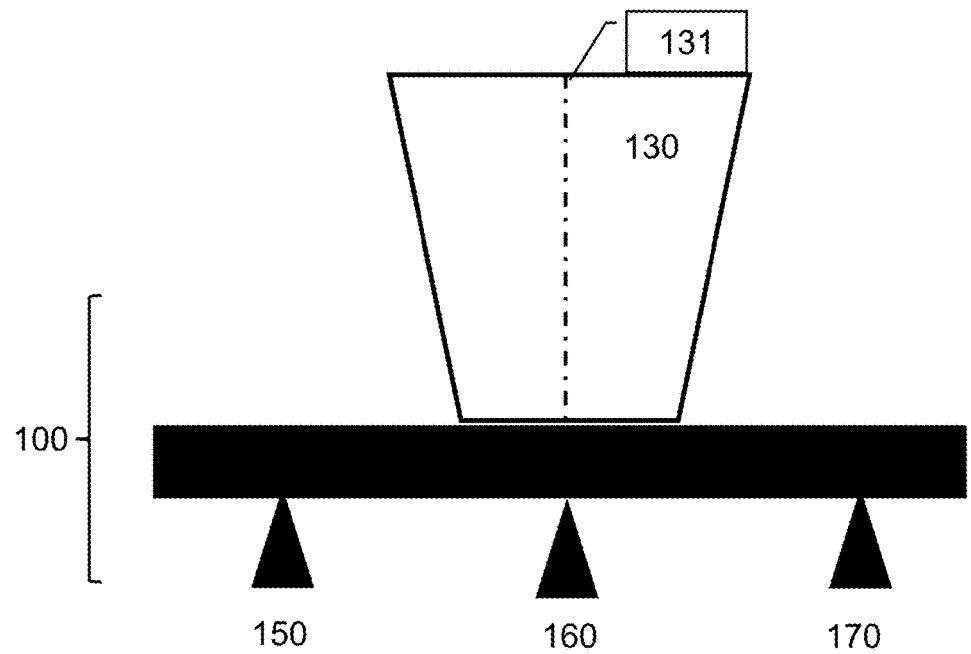
FIG. 4 is a simplified schematic diagram of the disclosed liquid tank measuring system.

FIG. 4 is a simplified schematic diagram of the disclosed liquid tank measuring system 100. The centerline 131 of tank 130 is located above the middle load cell 160. Each of the three load cells, 150, 160, and 170, provides the total weight on the platform 120. Therefore, the sensitivity of the load cells 150, 160, and 170 is not important.

Figure 5:
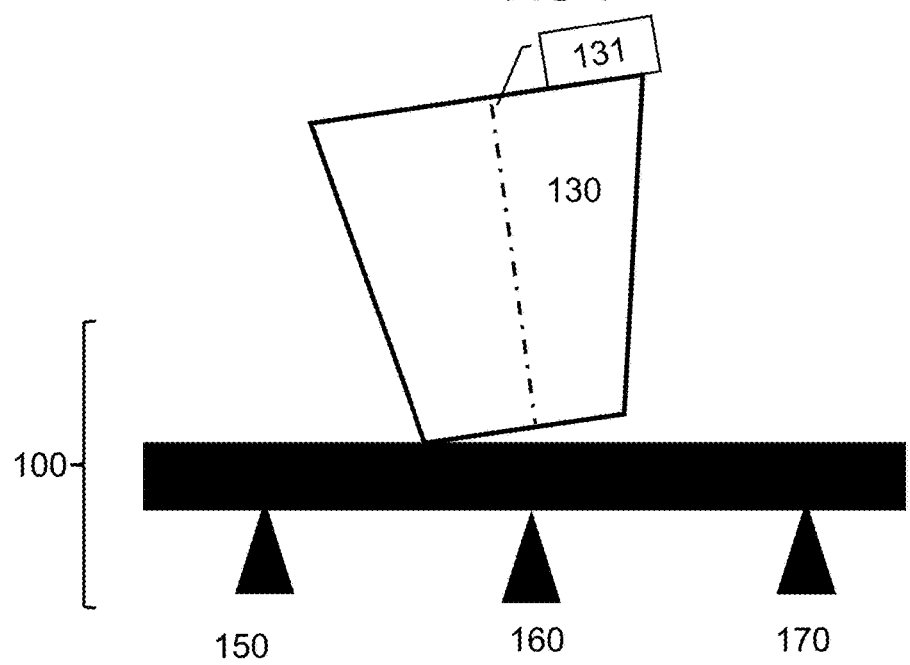
FIG. 5 is the simplified schematic diagram of the disclosed liquid tank measuring system of FIG. 4 showing the effect on the measurement when the tank is not level.

FIG. 5 provides a simplified schematic diagram of the disclosed liquid tank measuring system 100 of FIG. 4 when the tank 130 is not level. As long as the system 100 was calibrated with the tank 130 in that position and the tank 130 does not shift, the disclosed liquid tank measuring system 100 will provide accurate weight measurements.

Comparative Example

FIG. 6 is a simplified schematic prior art platform measuring system 10 which calculates the weight on the platform 12 by summing the total weight measured by each of the three load cells, 15, 16, and 17. In this example, load cell 15 has a sensitivity of 1.95 mV/Volt; load cell 16 has a sensitivity of 2.00 mV/Volt; and load cell 17 has a sensitivity of 2.05 mV/Volt.

FIG. 7 provides the prior art platform measuring system 10 of FIG. 6 with a weight 20 on the left side of the platform 12. Because the weight 20 is located over the lower sensitivity load cell 15, the system 10 will under report the total weight (i.e., the total weight reported will be less than the actual weight of the mass).

FIG. 8 provides the prior art platform measuring system 10 of FIG. 6 with a weight 20 on the left side of the platform 12. Because the weight 20 is located over the normal sensitivity load cell 16, the system 10 will report the accurate total weight.

FIG. 9 provides the prior art platform measuring system 10 of FIG. 6 with a weight 20 on the left side of the platform 12. Because the weight 20 is located over the higher sensitivity load cell 17, the system 10 will over report the total weight (i.e., the total weight reported will be more than the actual weight of the mass).

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

What is claimed is:

1. A method to detect a load cell failure in a liquid tank measuring system, the liquid tank measuring system comprising:
   i. three or more load cells,
   ii. a load cell transmitter communicating a signal from each of the three or more load cells to a programmable logic controller;
   iii. a weighing platform connected to each of the three or more load cells;
   iv. a tank located on the weighing platform; and
   v. the programmable logic controller which receives communication from the load cell transmitter; the method comprising:
      a. calibrating the three or more load cells to measure a total weight on the platform;
      b. adding a processing liquid to the tank;
      c. monitoring each of the three or more load cells to determine whether a weight determined by one of the three or more load cells deviates from a weight determined by a remaining amount of the three or more load cells;
      d. scheduling repair of a load cell when the weight determined by that load cell deviates from the weight determined by the remaining amount of the three or more load cells; and
      e. monitoring the remaining amount of the three or more load cells for weight consistency until the load cell is repaired.

2. The method of claim 1, wherein the calibration step comprises determining a weight at each load cell of an empty tank and at least two known volumes of calibration liquid in the tank.

3. The method of claim 2, wherein the calibration liquid is the same as the processing liquid.

4. The method of claim 1, further comprising cleaning the tank prior to the calibration step.

5. The method of claim 1, wherein the calibration step is performed after a system failure or physical event disrupts the liquid tank measuring system.

6. The method of claim 1, wherein the liquid tank measuring system comprises 3 load cells.

7. The method of claim 1, wherein the liquid tank measuring system comprises 4 load cells.

8. The method of claim 1, wherein the liquid tank measuring system comprises 10 load cells.

9. A method to detect a load cell failure in a liquid tank measuring system, the liquid tank measuring system comprising:
   i. three or more load cells,
   ii. a load cell transmitter communicating a signal from each of the three or more load cells to a programmable logic controller;
   iii. a weighing platform connected to each of the three or more load cells;
   iv. a tank located on the weighing platform; and
   v. the programmable logic controller which receives communication from the load cell transmitter; the method comprising:
      a. calibrating each of the three or more load cells to measure a total weight on the platform;
      b. adding a processing liquid to the tank;
      c. monitoring each of the three or more load cells to determine whether a weight determined by one of the three or more load cells deviates from a weight determined by a remaining amount of the three or more load cells;
      d. scheduling repair of a load cell when the weight determined by that load cell deviates from the weight determined by the remaining amount of the three or more load cells; and
      e. monitoring the remaining amount of the three or more load cells for weight consistency until the load cell is repaired.

* * * * *